United States Patent
Qi et al.

(10) Patent No.: US 10,127,040 B2
(45) Date of Patent: Nov. 13, 2018

(54) PROCESSOR AND METHOD FOR EXECUTING MEMORY ACCESS AND COMPUTING INSTRUCTIONS FOR HOST MATRIX OPERATIONS

(71) Applicant: BEIJING BAIDU NETCOM SCIENCE AND TECHNOLOGY CO., LTD., Beijing (CN)

(72) Inventors: Wei Qi, Beijing (CN); Jian Ouyang, Beijing (CN); Yong Wang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 227 days.

(21) Appl. No.: 15/279,217

(22) Filed: Sep. 28, 2016

(65) Prior Publication Data
US 2018/0032336 A1  Feb. 1, 2018

(30) Foreign Application Priority Data
Aug. 1, 2016  (CN) .......................... 2016 1 0621990

(51) Int. Cl.
*G06F 9/38*  (2018.01)
*G06F 9/30*  (2018.01)
*G06F 12/0875*  (2016.01)

(52) U.S. Cl.
CPC ........ *G06F 9/30043* (2013.01); *G06F 9/3877* (2013.01); *G06F 12/0875* (2013.01); *G06F 2212/452* (2013.01)

(58) Field of Classification Search
CPC . G06F 9/30043; G06F 9/3877; G06F 12/0875
See application file for complete search history.

(56) References Cited

U.S. PATENT DOCUMENTS

| | | | |
|---|---|---|---|
| 6,000,027 A * | 12/1999 | Pawate | G09G 5/39 345/519 |
| 2006/0271738 A1* | 11/2006 | Tran | G06F 9/30043 711/122 |
| 2014/0013083 A1* | 1/2014 | Jha | G06F 9/30145 712/205 |

* cited by examiner

*Primary Examiner* — Jyoti Mehta
(74) *Attorney, Agent, or Firm* — Seed IP Law Group LLP

(57) ABSTRACT

The present application discloses a processor and a method for executing an instruction on a processor. A specific implementation of the processor includes: a host interaction device, an instruction control device, an off-chip memory, an on-chip cache and an array processing device, wherein the host interaction device is configured to exchange data and instructions with a host connected with the processor, wherein the exchanged data has a granularity of a matrix; the off-chip memory is configured to store a matrix received from the host, on which a matrix operation is to be performed; and the instruction control device is configured to convert an external instruction received from the host to a series of memory access instructions and a series of computing instructions and execute the converted instructions. The implementation can improve the execution efficiency of a deep learning algorithm.

13 Claims, 6 Drawing Sheets

PROCESSOR AND METHOD FOR EXECUTING MEMORY ACCESS AND COMPUTING INSTRUCTIONS FOR HOST MATRIX OPERATIONS

CROSS-REFERENCE TO RELATED APPLICATION

This application is related to and claims priority from Chinese Application No. 201610621990.X, filed on Aug. 1, 2016, entitled "PROCESSOR AND METHOD FOR EXECUTING INSTRUCTIONS ON PROCESSOR," the entire disclosure of which is hereby incorporated by reference.

TECHNICAL FIELD

The present application relates to the field of computer technology, specifically to the field of processor technology, and more specifically to a processor and a method for executing an instruction on a processor.

BACKGROUND

At present, central processing units and graphics processing units have been widely used in the field of artificial intelligence computing. Although the latter can provide stronger computing capability than the former, these two kinds of hardware are general-purpose processors based on a fine granularity instruction stream, and their architectures have following comonalities: one instruction in the fine granularity instruction stream only accomplishes the most basic computing operations such as addition, multiplication and memory access. For the arithmetic logic units with a fine granularity in the processor, one unit generally performs only one multiplication and addition operation. Memory access modes and general data paths supporting the fine granularity access have to ensure fine granularity memory access and general data paths.

In the prior art processors, the computing efficiency of the fine granularity instruction stream, the arithmetic logic units and the general memory access modes and data paths is not high for such specific artificial intelligence applications. On one hand, the fine granularity instruction stream and the arithmetic logic units need to frequently load and store data, and the efficiency is relatively low. On the other hand, for the large number of artificial intelligence applications, a general architecture will have a large number of redundant circuit logics, resulting in a complicated system design, more circuit resource consumption and higher total cost.

SUMMARY

To solve the technical problems mentioned in the background, the present application is to provide an improved processor and a method for executing an instruction on a processor.

In a first aspect, the present application provides a processor, comprising a host interaction device, an instruction control device, an off-chip memory, an on-chip cache and an array processing device, wherein the host interaction device is configured to exchange data and instructions with a host connected with the processor, wherein the exchanged data has a granularity of a matrix; the off-chip memory is configured to store a matrix received from the host, on which a matrix operation is to be performed; and the instruction control device is configured to convert an external instruction received from the host to a series of memory access instructions and a series of computing instructions and execute the converted instructions, wherein the external instruction comprises a matrix operation instruction, the memory access instructions are used to control the off-chip memory and the on-chip cache to exchange data therebetween with a granularity of a matrix sub-block, and the computing instructions are used to control the array processing device to perform a matrix operation on matrix sub-blocks in the on-chip cache.

In some embodiments, the array processing device has a plurality of processing elements configured to perform sub-operations of the matrix operation in parallel.

In some embodiments, the processor further includes an activation processing device configured to perform an activation function computing operation, wherein the instruction control device is further configured to: generate an activation instruction used to control the activation processing device to operate when the external instruction further comprises an activation function computing instruction.

In some embodiments, the instruction control device is further configured to: further generate a control instruction for transmitting streamingly resulting matrix sub-blocks generated by the array processing device performing the matrix operation on the matrix sub-blocks to the activation processing device, when the external instruction further comprises the activation function computing instruction.

In some embodiments, the instruction control device comprises: a memory access instruction device, configured to generate a series of memory access instructions and control execution of the memory access instructions; and a computing instruction device, configured to generate a series of computing instructions and control execution of the computing instructions.

In some embodiments, the memory access instruction device is further configured to: send a first notification signal to the computing instruction device each time an operation of reading a matrix sub-block to be processed from the off-chip memory to the on-chip cache is accomplished by using a memory access instruction; and the computing instruction device is further configured to: execute a computing instruction in response to the first notification signal to control the array processing device to perform the matrix operation sequentially on matrix sub-blocks which have been read in the on-chip cache.

In some embodiments, the computing instruction device is further configured to: send a second notification signal to the memory access instruction device each time the matrix operation on a matrix sub-block is accomplished by using a computing instruction; and the memory access instruction device is further configured to: execute a memory access instruction of reading a next matrix sub-block of the matrix in the off-chip memory to the on-chip cache, in response to the second notification signal.

In some embodiments, a size of the matrix sub-block matches a maximum computing capability of each operation of the array processing device and a storage space of the on-chip cache.

In a second aspect, the present application provides a method for executing an instruction on a processor, wherein the processor comprises a host interaction device, an off-chip memory, an on-chip cache and an array processing device, the method comprising: exchanging data and instructions with a host connected with the processor by using the host interaction device, wherein the exchanged data has a granularity of a matrix; storing on the off-chip memory a matrix received from the host, on which a matrix operation is to be performed; and converting an external instruction received from the host to a series of memory access instructions and a series of computing instructions and executing the converted instructions, wherein the external instruction comprises a matrix operation instruction, the memory access instructions are used to control the off-chip memory and the on-chip cache to exchange data therebetween with a granularity of a matrix sub-block, and the computing instructions are used to control the array processing device to perform a matrix operation on matrix sub-blocks in the on-chip cache.

In some embodiments, the array processing device has a plurality of processing elements configured to perform sub-operations of the matrix operation in parallel.

In some embodiments, the processor further comprises an activation processing device configured to perform an activation function computing operation; and the converting an external instruction received from the host to a series of memory access instructions and a series of computing instructions further comprises: generating an activation instruction used to control the activation processing device to operate when the external instruction further comprises an activation function computing instruction.

In some embodiments, the converting an external instruction received from the host to a series of memory access instructions and a series of computing instructions further comprises:

further generating a control instruction for transmitting streamingly resulting matrix sub-blocks generated by the array processing device performing the matrix operation on the matrix sub-blocks to the activation processing device, when the external instruction further comprises the activation function computing instruction.

In some embodiments, the method further includes: executing a computing instruction to control the array processing device to perform the matrix operation sequentially on matrix sub-blocks which have been read in the on-chip cache each time an operation of reading a matrix sub-block to be processed from the off-chip memory to the on-chip cache is accomplished in response to a memory access instruction.

In some embodiments, the method further includes: executing a memory access instruction of reading a next matrix sub-block of the matrix in the off-chip memory to the on-chip cache each time the matrix operation on a matrix sub-block is accomplished in response to a computing instruction.

In some embodiments, a size of the matrix sub-block matches a maximum computing capability of each operation of the array processing device and a storage space of the on-chip cache.

According to the processor and the method for executing an instruction on a processor provided in the present application, the generated memory access instructions and computing instructions perform memory access and computing matrix sub-block by matrix sub-block. Compared with the traditional memory access and operations bit by bit, the processor provided in the embodiment of the present application can accomplish a computing task by executing fewer memory access instructions and computing instructions, has higher processing efficiency, and can save the operation time. And, the memory access and computing has a granularity of a matrix sub-block, such that even a greater matrix can be partitioned prior to the memory access and computing, and the processor can process matrixes in various sizes, which ensures the universality of the processor for matrix processing.

BRIEF DESCRIPTION OF THE DRAWINGS

After reading detailed descriptions of non-limiting embodiments with reference to the following accompanying drawings, other features, objectives and advantages of the present application will be more apparent.

DETAILED DESCRIPTION OF PREFERRED EMBODIMENTS

The present application is further described in detail through the accompanying drawing and the embodiment. It should be understood that, the specific embodiments described herein are merely used to explain the relevant invention, and are not intended to limit the present invention. In addition, it should be further noted that, in order to facilitate the description, merely the parts related to the relevant invention are shown in the accompanying drawings.

It should be noted that, the embodiments of the present application and features in the embodiments may be combined on a non-conflict basis. The present application will be described in detail through the accompanying drawings and the embodiments.

Figure 1:
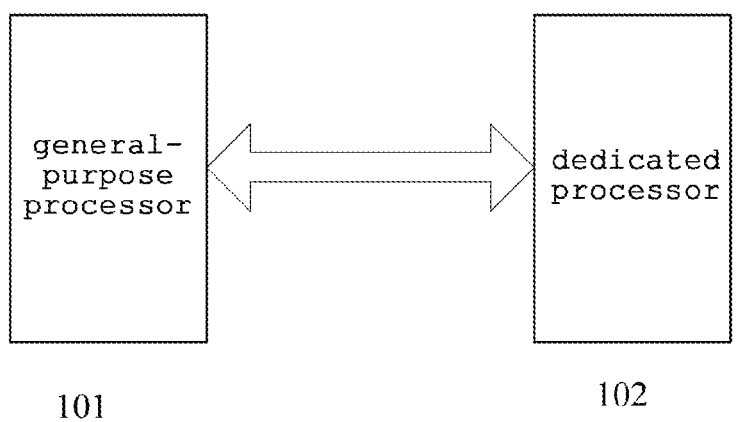
FIG. 1 is a diagram of an exemplary system architecture to which the present application is applicable.

FIG. 1 illustrates an exemplary system architecture 100 to which a processor and a method for executing an instruction on a processor according to embodiments of the present application are applicable.

As shown in FIG. 1, the system architecture 100 may include a general-purpose processor 101 and a dedicated processor 102.

The general-purpose processor 101 is configured to send an external instruction (for example, a matrix operation) and data to be processed (for example, a matrix) to the dedicated processor 102. The dedicated processor 102 may execute according to the external instruction, process the received data, and send a result generated from the processing back to the general-purpose processor 101, finally. The dedicated processor 101 may also be referred to as a host, and the dedicated processor 102 may be designed from a Field-Programmable Gate Array (FPGA).

It should be noted that the processor provided in embodiments of the present application generally refers to the dedicated processor 102 in FIG. 1, and correspondingly, the method for executing an instruction on a processor is generally performed by the dedicated processor 102.

It should be understood that the numbers of the general-purpose processor 101 and the dedicated processor 102 in FIG. 1 are merely schematic. There may be any number of general-purpose processors and any number of dedicated processors as required in practice.

Figure 2:
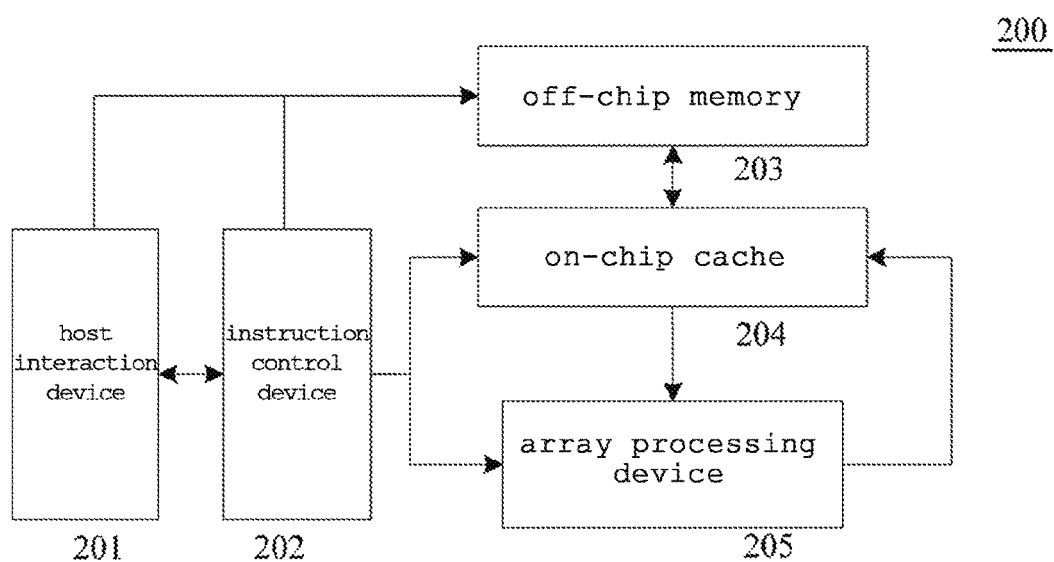
FIG. 2 is a schematic structural diagram of a processor according to one embodiment of the present application.

Referring to FIG. 2, a schematic structural diagram of a processor according to the present application is illustrated.

As shown in FIG. 2, the processor 200 includes a host interaction device 201, an instruction control device 202, an off-chip memory 203, an on-chip cache 204 and an array processing device 205.

The host interaction device 201 may be connected with an external host (for example, the general-purpose processor in FIG. 1), so as to achieve the instruction and data exchange between the processor 200 and the host. In practice, the host interaction device 201 may achieve a connection with the host through a peripheral component interface express (PCIE) or other buses. The host interaction device 201 may be electrically connected with the instruction control device 202, so as to transmit an external instruction received from the host to the instruction control device 202 to wait for the instruction control device 202 to further process the external instruction. The host interaction device 201 may also be electrically connected with the off-chip memory 203, so as to store data to be processed, which is received from the host, in the off-chip memory 203 to wait for subsequent processing, and transmit the result data processed in the off-chip memory 203 to the host. It should be noted that the data exchanged by the host interaction device has a granularity of a matrix, that is, the data has a coarse granularity, which is different from the fine granularity data generally having a granularity of a bit during the data exchange.

The instruction control device 202 may be configured to perform a conversion operation on the external instruction received from the host to generate a series of memory access instructions and a series of computing instructions. The external instruction includes a matrix operation instruction, that is, the external instruction may be a coarse granularity instruction different from the general fine granularity instruction in which one instruction is configured to perform addition or multiplication for a number or a memory access. The memory access instruction generated by the instruction control device 202 is used to control the off-chip memory 203 and the on-chip cache 204 to exchange data therebetween with a granularity of a matrix sub-block, and the generated computing instruction is used to control the array processing device 205 to perform a matrix operation on the matrix sub-blocks in the on-chip cache. In addition to being configured to generate the memory access instruction and the computing instruction, the instruction control device 202 is further configured to control the instructions to be executed in a certain order. Generally, the instruction control device 202 may control the off-chip memory 203, the on-chip cache 204 and the array processing device 205 to execute instructions in a certain order by sending signals. For example, when determining to execute the memory access instruction, the instruction control device 202 may send a control signal, so as to read matrix sub-blocks split from the matrix in the off-chip memory to the on-chip cache. For another example, when determining to execute the computing instruction, the instruction control device 202 may send a corresponding control signal to the array processing device 205, such that the array processing device 205 may perform a matrix operation on matrix sub-blocks in the on-chip cache 204 under the control of the control signal.

The array processing device repeatedly sets a great number of identical processing elements (PE) and interconnects them into an array in a certain manner, and performs, in parallel, operations stipulated by the same set of instructions on different data allocated to the PEs under the control of a single control component. The array processing device is suitable for matrix operations. In this embodiment, the array processing device may perform a matrix operation under a control signal sent from the instruction control device 202 executing a computing instruction.

In some alternative implementations of this embodiment, the array processing device has a plurality of processing elements configured to perform sub-operations of the matrix operation in parallel. Alternatively, when the matrix operation performed by the array processing device is a matrix multiplication operation, the processing elements in the array processing device are configured to perform a multiplication operation on different rows of a multiplicand matrix sub-block and a multiplier matrix sub-block, respectively, and the elements may perform the multiplication operation in parallel. In this manner, the elements in the array processing device may process the operation on the matrix sub-blocks in parallel, so as to improve the overall processing efficiency. Moreover, in the process of deep learning, the multiplicand matrix corresponding to an input layer is generally small, while the multiplier matrix corresponding to a hidden layer is generally large. The processing elements in the array processing device are configured to perform a multiplication operation on different rows of a multiplicand matrix sub-block and a multiplier matrix sub-block, respectively, such that the number of memory accesses of the multiplier matrix can be reduced, thereby facilitating the improvement of the overall processing efficiency during the execution of an actual deep learning algorithm.

In some alternative implementations of this embodiment, the instruction control device 202 includes: a memory access instruction device configured to generate a series of memory access instructions and control execution of the memory access instructions; and a computing instruction device configured to generate a series of computing instructions and control execution of the computing instructions. In the implementations, the memory access instruction device and the computing instruction device in the instruction control device may be responsible for controlling the memory access instructions and the computing instructions, respectively.

Figure 3:
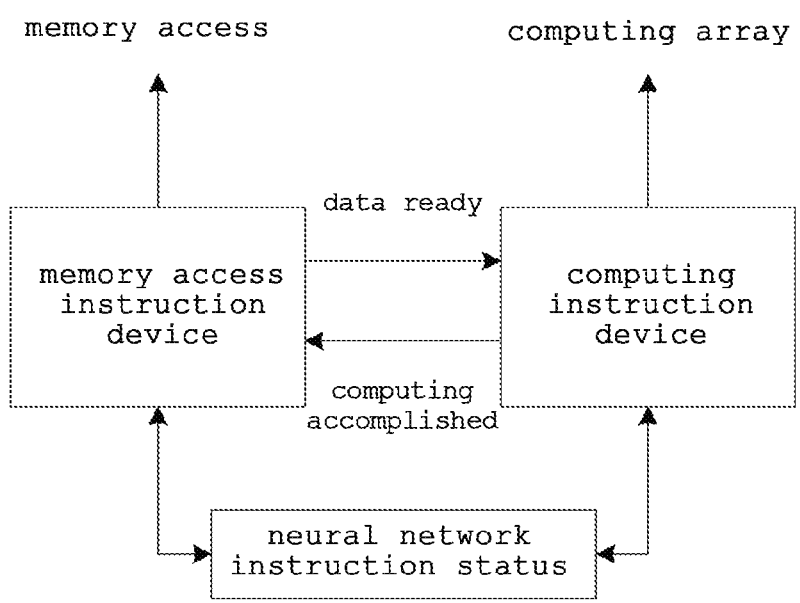
FIG. 3 is a signal interaction diagram of various devices of a processor in one implementation according to the embodiment of FIG. 2.

Referring to FIG. 3, a signal interaction diagram of various devices of a processor in some alternative implementations according to the embodiment is illustrated. In FIG. 3, the memory access instructions executed by the memory access instruction device and the computing instructions executed by the computing instruction device may be determined according to a neural network instruction state.

In some alternative implementations of this embodiment, the memory access instruction device is further configured to: send a first notification signal (i.e. a "data ready" signal in FIG. 3) to the computing instruction device each time an operation of reading a matrix sub-block to be processed from the off-chip memory to the on-chip cache is accomplished by using the memory access instruction. The "data ready" signal is used to notify that the matrix sub-blocks are ready. The computing instruction device is further configured to: execute the computing instruction in response to the first notification signal to send a control signal to the array processing device, so that the array processing device performs the matrix operation sequentially on the matrix sub-blocks which have been read in the on-chip cache. Through this method, the computing instruction may continuously process the matrix sub-blocks which have been read in the on-chip cache, which improves the computing efficiency.

In some alternative implementations of this embodiment, the computing instruction device is further configured to: send a second notification signal (i.e. a "computing accomplished" signal in FIG. 3) to the memory access instruction device each time the matrix operation on a matrix sub-block is accomplished by using a computing instruction. The "computing accomplished" signal is used to notify that the matrix operation has been accomplished once. The memory access instruction device is further configured to: execute a memory access instruction of reading the next matrix sub-block of the matrix in the off-chip memory to the on-chip cache, in response to the second notification signal, such that a new matrix sub-block can be read by using the space occupied by the matrix sub-block whose computation has been accomplished in the on-chip cache, which optimize the utilization of the space of the on-chip cache.

In some alternative implementations of this embodiment, the size of the matrix sub-block matches the maximum computing capability of each operation of the array processing device and the storage space of the on-chip cache. In the implementations, the size of the matrix sub-block read from the off-chip memory to the on-chip cache by using the memory access instruction each time matches the maximum computing capability of each operation of the array processing device and the storage space of the on-chip cache.

It should be noted that the signal interaction diagram shown in FIG. 3 is merely an example which does not limit the protection scope of the present application.

According to the processor provided in the embodiment of the present application, the generated memory access instructions and computing instructions perform memory access and computing matrix sub-block by matrix sub-block. Compared with the traditional memory access and operations bit by bit, the processor provided in the embodiment of the present application can accomplish a computing task by executing fewer memory access instructions and computing instructions, has higher processing efficiency, and can save the operation time. And, the memory access and computing has a granularity of a matrix sub-block, such that even a greater matrix can be partitioned prior to the memory access and computing, and the processor can process matrixes in various sizes, which ensures the universality of the processor for matrix processing.

Figure 4:
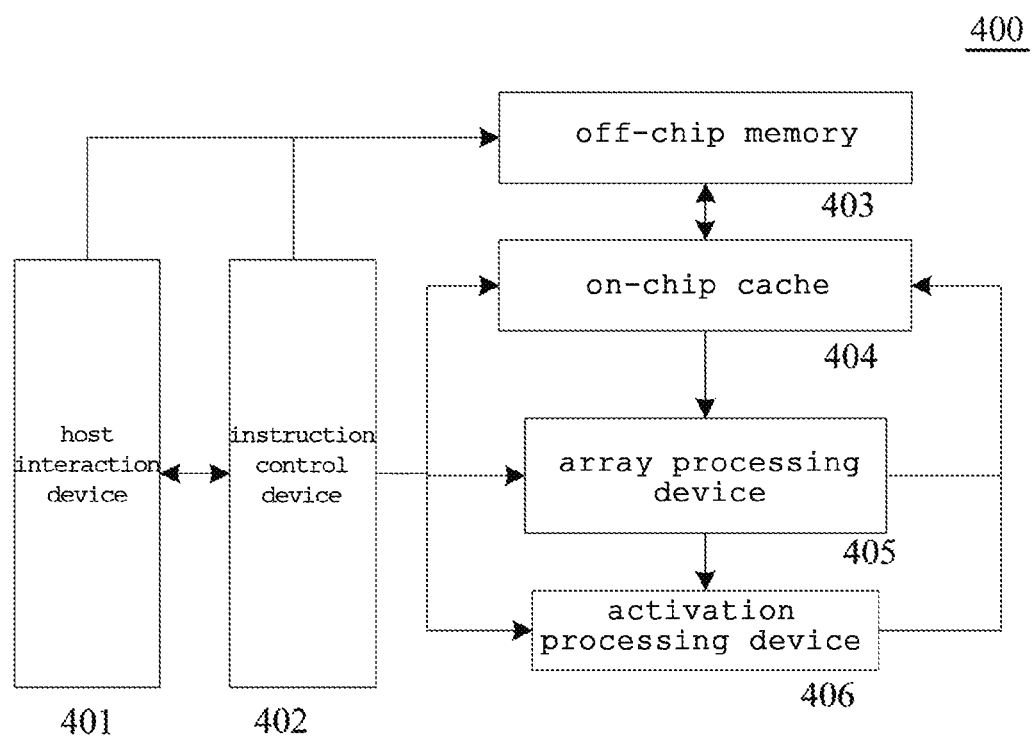
FIG. 4 is a schematic structural diagram of a processor according to another embodiment of the present application.

Referring to FIG. 4, another schematic structural diagram of a processor 400 according to the present application is illustrated.

As shown in FIG. 4, the processor 400 includes a host interaction device 401, an instruction control device 402, an off-chip memory 403, an on-chip cache 404, an array processing device 405 and an activation processing device 406.

In the embodiment, the host interaction device 401, the instruction control device 402, the off-chip memory 403, the on-chip cache 404 and the array processing device 405 may correspond to the host interaction device 201, the instruction control device 202, the off-chip memory 203, the on-chip cache 204 and the array processing device 205 in the embodiment of FIG. 2, which will not be repeated herein. Different from the embodiment of FIG. 2, the processor 400 in this embodiment further includes an activation processing device 406 configured to perform an activation function computing operation. And, the instruction control device 402 is further configured to: generate an activation instruction configured to control the activation processing device to operate when the external instruction further includes an activation function computing instruction. In the implementation, since an artificial intelligence algorithm often involves an operation of computing an activation function, the processor 400 is further provided with an activation processing device 406 configured to perform an activation function computing operation. Correspondingly, when the external instruction received by the instruction control device 402 further includes an activation function computing instruction, that is, upon receiving a matrix computing operation with an activation function, the instruction control device 402 further generates an activation instruction used to control the activation processing device 406 to operate.

In some alternative implementations of this embodiment, the instruction control device 402 is further configured to: further generate a control instruction for transmitting streamingly resulting matrix sub-blocks generated by the array processing device performing the matrix operation on the matrix sub-blocks to the activation processing device, when the external instruction further includes the activation function computing instruction. In the implementation, the processor may cause a result matrix generated by the array processing device performing the matrix operation on the matrix sub-blocks by to be directly transmitted to the activation processing device by using the control instruction, for the activation processing device to perform an activation function computing operation. In addition, the resulting matrix may be transmitted streamingly. The activation processing device may immediately process the result matrix currently received, such that the operation of the activation processing device may be performed in parallel with the matrix operation performed by the array processing device on the subsequent matrix sub-blocks. Therefore, the time of activation function computing may almost be covered by that of the operation performed by the array processing device on the matrix sub-blocks, and the time of activation function computing may be omitted.

Figure 5:
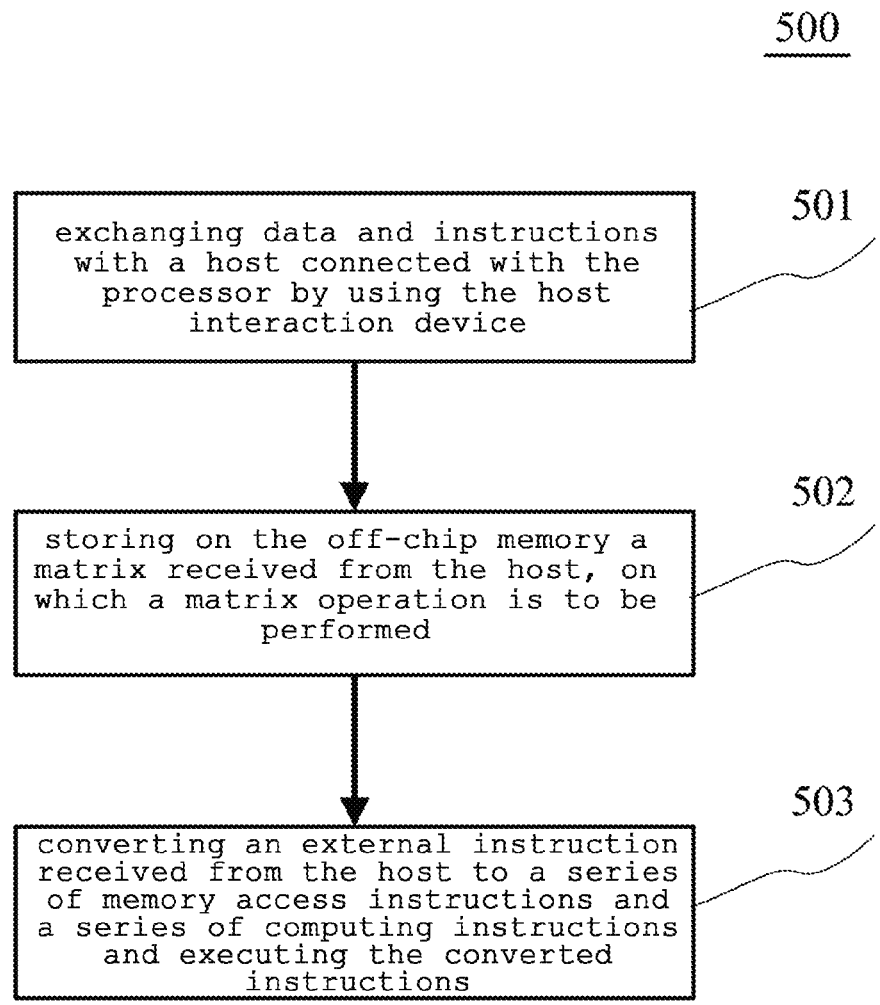
FIG. 5 is a flowchart of a method for executing an instruction on a processor according to one embodiment of the present application.

Referring to FIG. 5, a flowchart 500 of a method for executing an instruction on a processor according to one embodiment of the present application is illustrated. The processor has a host interaction device, an off-chip memory, an on-chip cache and an array processing device. The method for executing an instruction on a processor includes the following steps.

Step 501, exchanging data and instructions with a host connected with the processor by using the host interaction device.

In this embodiment, the processor may exchange data and instructions with a host connected therewith by using the host interaction device. The exchanged data has a granularity of a matrix.

Step 502, storing on the off-chip memory a matrix received from the host, on which a matrix operation is to be performed.

In this embodiment, based on step 501, the processor stores the matrix received from the host on the off-chip memory, on which a matrix operation is to be performed.

Step 503, converting an external instruction received from the host to a series of memory access instructions and a series of computing instructions and executing the converted instructions.

In this embodiment, based on the external instruction received in step 501, the processor performs a conversion operation thereon to convert the external instruction to a series of memory access instructions and a series of computing instructions, wherein the external instruction comprises a matrix operation instruction, the memory access instructions are used to control the off-chip memory and the on-chip cache to exchange data therebetween with a granularity of a matrix sub-block, and the computing instructions are used to control the array processing device to perform a matrix operation on matrix sub-blocks in the on-chip cache.

In some alternative implementations of this embodiment, the array processing device includes a plurality of processing elements configured to perform sub-operations of the matrix operation in parallel. The specific processing of this embodiment may correspond to the implementation in the embodiment of FIG. 2, which will not be repeated herein.

In some alternative implementations of this embodiment, the processor further includes an activation processing device configured to perform an activation function computing operation. Step 503 further includes: generating an activation instruction configured to control the activation processing device to operate when the external instruction further includes an activation function computing instruction. The specific processing of this embodiment may correspond to the embodiment of FIG. 3, which will not be repeated herein.

In some alternative implementations of this embodiment, step 503 further includes: further generating a control instruction for transmitting streamingly resulting matrix sub-blocks generated by the array processing device performing the matrix operation on the matrix sub-blocks to the activation processing device, when the external instruction further comprises the activation function computing instruction. The specific processing of this embodiment may correspond to the embodiment of FIG. 3, which will not be repeated herein.

Figure 6:
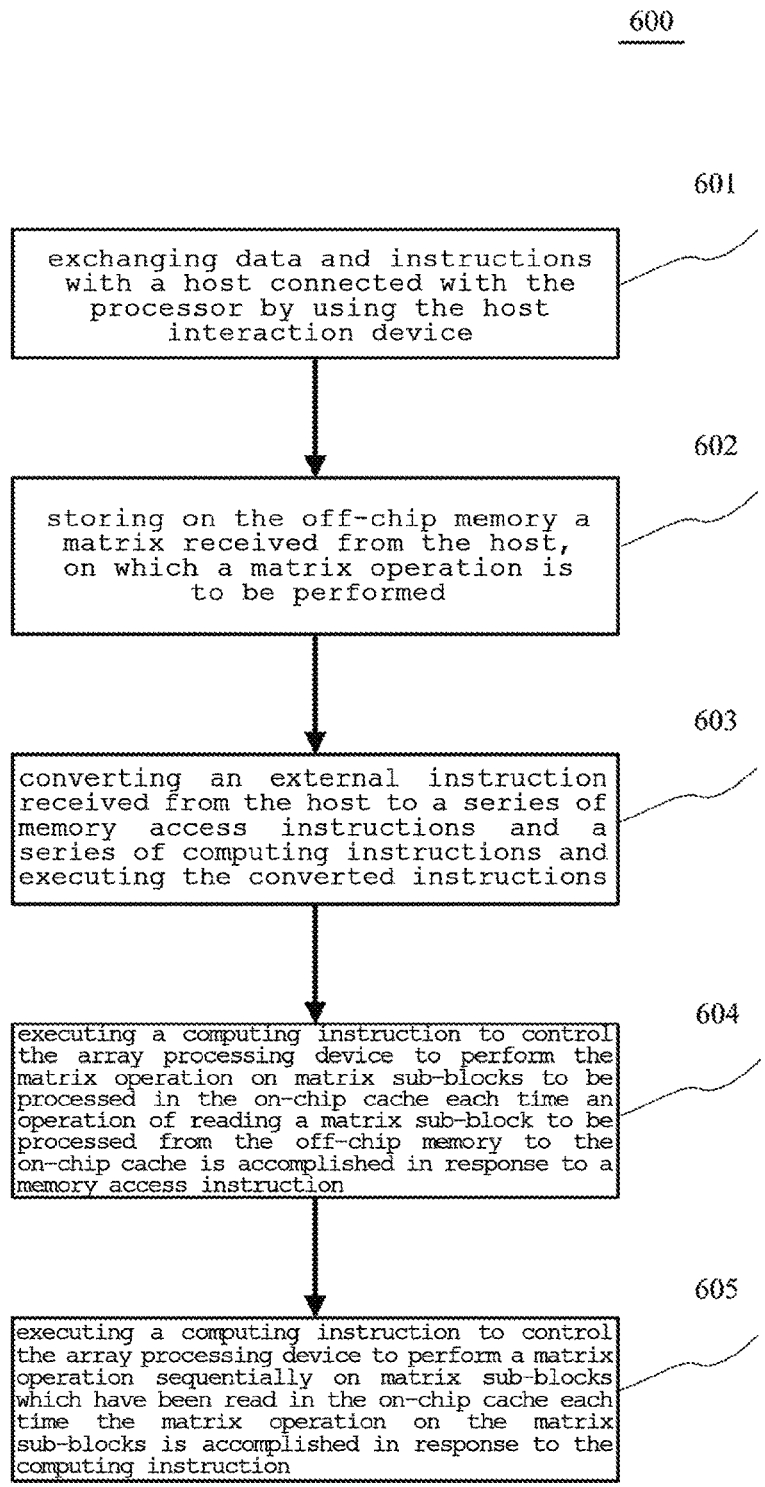
FIG. 6 is a flow chart of the method for executing an instruction on a processor according to another embodiment of the present application.

Referring to FIG. 6, a flowchart 600 of a method for executing an instruction on a processor according to one embodiment of the present application is illustrated. The processor has a host interaction device, an off-chip memory, an on-chip cache and an array processing device. The method for executing an instruction on a processor includes the following steps.

Step 601, exchanging data and instructions with a host connected with the processor by using the host interaction device.

In this embodiment, the specific processing of this step may correspond to step 401 in the embodiment of FIG. 4, which will not be repeated herein.

Step 602, storing on the off-chip memory a matrix received from the host, on which a matrix operation is to be performed.

In this embodiment, the specific processing of this step may correspond to step 402 in the embodiment of FIG. 4, which will not be repeated herein.

Step 603, converting an external instruction received from the host to a series of memory access instructions and a series of computing instructions and executing the converted instructions.

In this embodiment, the specific processing of this step may correspond to step 403 in the embodiment of FIG. 4, which will not be repeated herein.

Step 604, executing a computing instruction to control the array processing device to perform the matrix operation on matrix sub-blocks to be processed in the on-chip cache each time an operation of reading a matrix sub-block to be processed from the off-chip memory to the on-chip cache is accomplished in response to a memory access instruction.

In this embodiment, the processor may execute a computing instruction to control the array processing device to perform the matrix operation sequentially on matrix sub-blocks which have been read in the on-chip cache each time an operation of reading a matrix sub-block to be processed from the off-chip memory to the on-chip cache is accomplished in response to a memory access instruction. The on-chip cache may send, after the reading of the matrix sub-blocks in the off-chip memory has been accomplished once, a signal to notify the processor that the reading of the matrix sub-blocks has been accomplished. During the execution of the array processing device, the processor may send a control signal of computing the currently read matrix sub-blocks to the array processing device. The array processing device may sequentially perform a matrix operation on the matrix sub-blocks according to the received control signals. That is, after each matrix sub-block before the matrix sub-block has been computed, the array processing device may perform a matrix operation on the matrix sub-block under the control of a control signal of a current computing task. Through this method, it can be ensured that the array processing device can continuously perform the matrix operation on the matrix sub-blocks, which reduces the idle time.

In step 604, the processor may execute a computing instruction after the data is ready to notify the array processing device to make computing, which improves the processing efficiency.

Step 605, executing a computing instruction to control the array processing device to perform a matrix operation sequentially on matrix sub-blocks which have been read in the on-chip cache each time the matrix operation on the matrix sub-blocks is accomplished in response to the computing instruction.

In this embodiment, the processor may execute a memory access instruction of reading the next matrix sub-block of the matrix in the off-chip memory to the on-chip cache each time the matrix operation on the matrix sub-blocks is accomplished by the computing instruction. The array processing device may send a signal to notify the processor that the operation on the matrix sub-block has been accomplished once, after the matrix operation on the matrix sub-block has been accomplished once. Each time the matrix operation on the matrix sub-blocks is accomplished through the computing instruction, the processor may execute a memory access instruction of reading the next matrix sub-block of the matrix in the off-chip memory to the on-chip cache.

In step 605, after the array processing device accomplishes the operation on the matrix sub-block once, the on-chip cache does not need to continuously store the matrix sub-block. In this case, the processor immediately reads the next matrix sub-block, which facilitates the utilization of the storage space of the on-chip cache.

In this embodiment, when the on-chip cache can accommodate more than two matrix sub-blocks, the operation of reading the matrix sub-blocks by the on-chip cache may be performed in parallel with the operation on the matrix sub-blocks by the array processing device in a streaming way through the method in this embodiment. As an example of the on-chip cache accommodating two matrix sub-blocks, the operation of reading the matrix sub-blocks by the on-chip cache may be performed with the operation on the matrix sub-blocks by the array processing device in a Ping-Pong streaming way. It should be noted that the technical solution of the present application may include one of step 604 and step 605, and may also include both of step 604 and step 605.

In some alternative implementations of this embodiment, the size of the matrix sub-block matches a maximum computing capability of each operation of the array processing device and a storage space of the on-chip cache. Generally, the size of the matrix sub-block and the size of the maximum matrix of each operation of the array processing device may be set to be identical to each other, to make full use of the capability of the array processing device. In addition, the storage space in the on-chip cache configured to store data to be computed may be set as N times (N is greater than or equal to 2) of the size of the matrix sub-block, such that the on-chip cache can pre-read the subsequent matrix sub-block to be computed.

According to the method provided in the above embodiment of the present application, the memory access instructions and the computing instructions are executed in parallel in a streaming way, which further improves the computing efficiency.

It should be noted that the flowcharts and block diagrams in the figures illustrate architectures, functions and operations that may be implemented according to the system, the method and the computer program product of the various embodiments of the present invention. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence.

In another aspect, the present application further provides a non-transitory computer storage medium. The computer storage medium may be the non-transitory computer storage medium included in the apparatus in the above embodiments, or a stand-alone computer storage medium which has not been assembled into the apparatus. The non-transitory computer storage medium stores one or more programs. When the one or more programs are executed by a processor including a host interaction device, an off-chip memory, an on-chip cache and an array processing device, the processor exchanges data and instructions with a host connected with the processor by using the host interaction device, wherein the exchanged data has a granularity of a matrix; stores on the off-chip memory a matrix received from the host, on which a matrix operation is to be performed; and converts an external instruction received from the host to a series of memory access instructions and a series of computing instructions and executing the converted instructions, wherein the external instruction comprises a matrix operation instruction, the memory access instructions are used to control the off-chip memory and the on-chip cache to exchange data therebetween with a granularity of a matrix sub-block, and the computing instructions are used to control the array processing device to perform a matrix operation on matrix sub-blocks in the on-chip cache.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A processor, comprising:
    a host interaction circuit;
    an instruction control circuit that includes a memory access instruction circuit and a computing instruction circuit;
    an off-chip memory;
    an on-chip cache; and
    an array processing circuit;
    the instruction control circuit being configured to:
        generate a series of memory access instructions;
        control execution of the memory access instructions; and
        send a first notification signal to the computing instruction circuit each time an operation of reading a matrix sub-block to be processed from the off-chip memory to the on-chip cache is accomplished by using a memory access instruction;
    the computing instruction circuit being configured to:
        generate a series of computing instructions;
        control execution of the computing instructions; and
        execute a computing instruction in response to the first notification signal to control the array processing circuit to perform a matrix operation sequentially on matrix sub-blocks which have been read in the on-chip cache;
    the host interaction circuit being configured to exchange data and instructions with a host connected with the processor, the exchanged data having a granularity of a matrix;
    the off-chip memory being configured to store a matrix on which the matrix operation is to be executed, the stored matrix received from the host; and
    the instruction control circuit being configured to convert an external instruction received from the host to the series of memory access instructions and the series of computing instructions and execute the converted instructions, the external instruction comprising a matrix operation instruction, the memory access instructions being used to control the off-chip memory and the on-chip cache to exchange data therebetween with a granularity of a matrix sub-block, and the computing instructions being used to control the array processing circuit to perform the matrix operation on matrix sub-blocks in the on-chip cache.

2. The processor according to claim 1, wherein the array processing circuit has a plurality of processing elements configured to perform sub-operations of the matrix operation in parallel.

3. The processor according to claim 1, further comprising an activation processing circuit configured to perform an activation function computing operation, wherein the instruction control circuit is further configured to:
    generate an activation instruction used to control the activation processing circuit to operate when the external instruction further comprises an activation function computing instruction.

4. The processor according to claim 3, wherein the instruction control circuit is further configured to:
    further generate a control instruction for transmitting streamingly resulting matrix sub-blocks generated by the array processing circuit performing the matrix operation on matrix sub-blocks to the activation processing circuit, when the external instruction further comprises the activation function computing instruction.

5. The processor according to claim 1, wherein the computing instruction circuit is further configured to:
    send a second notification signal to the memory access instruction circuit each time the matrix operation on a matrix sub-block is accomplished by using a computing instruction; and
    the memory access instruction circuit is further configured to:

execute a memory access instruction of reading a next matrix sub-block of the matrix in the off-chip memory to the on-chip cache, in response to the second notification signal.

6. The processor according to claim 1, wherein a size of a matrix sub-block matches a maximum computing capability of each operation of the array processing circuit and a storage space of the on-chip cache.

7. A method for executing an instruction on a processor, wherein the processor comprises a host interaction circuit, an instruction control circuit that includes a memory access instruction circuit and a computing instruction circuit, an off-chip memory, an on-chip cache and an array processing circuit, the method comprising:
with the instruction control circuit:
generating a series of memory access instructions;
controlling execution of the memory access instructions; and
sending a first notification signal to the computing instruction circuit each time an operation of reading a matrix sub-block to be processed from the off-chip memory to the on-chip cache is accomplished by using a memory access instruction;
with the computing instruction circuit:
generating a series of computing instructions;
controlling execution of the computing instructions; and
executing a computing instruction in response to the first notification signal to control the array processing circuit to perform a matrix operation sequentially on matrix sub-blocks which have been read in the on-chip cache;
exchanging data and instructions with a host connected with the processor by using the host interaction circuit, the exchanged data having a granularity of a matrix;
storing on the off-chip memory a matrix on which the matrix operation is to be executed, the stored matrix received from the host; and
converting an external instruction received from the host to the series of memory access instructions and the series of computing instructions and executing the converted instructions, the external instruction comprising a matrix operation instruction, the memory access instructions being used to control the off-chip memory and the on-chip cache to exchange data therebetween with a granularity of a matrix sub-block, and the computing instructions being used to control the array processing circuit to perform the matrix operation on matrix sub-blocks in the on-chip cache.

8. The method according to claim 7, wherein the array processing circuit has a plurality of processing elements configured to perform sub-operations of the matrix operation in parallel.

9. The method according to claim 8, wherein the processor further comprises an activation processing circuit configured to perform an activation function computing operation; and
the converting an external instruction received from the host to a series of memory access instructions and a series of computing instructions further comprises:
generating an activation instruction used to control the activation processing circuit to operate when the external instruction further comprises an activation function computing instruction.

10. The method according to claim 9, wherein the converting an external instruction received from the host to a series of memory access instructions and a series of computing instructions further comprises:
further generating a control instruction for transmitting streamingly resulting matrix sub-blocks generated by the array processing circuit performing the matrix operation on the matrix sub-blocks to the activation processing circuit, when the external instruction further comprises the activation function computing instruction.

11. The method according to claim 7, further comprising:
executing a computing instruction to control the array processing circuit to perform the matrix operation sequentially on matrix sub-blocks which have been read in the on-chip cache each time an operation of reading a matrix sub-block to be processed from the off-chip memory to the on-chip cache is accomplished in response to a memory access instruction.

12. The method according to claim 7, further comprising:
executing a memory access instruction of reading a next matrix sub-block of the matrix in the off-chip memory to the on-chip cache each time the matrix operation on a matrix sub-block is accomplished in response to a computing instruction.

13. The method according to claim 7, wherein a size of a matrix sub-block matches a maximum computing capability of each operation of the array processing circuit and a storage space of the on-chip cache.

* * * * *